Fred S. Sherman
Staley M. McCaskill
Jesse H. McCloud
INVENTORS

BY Dyne & Kirchner
ATTORNEYS

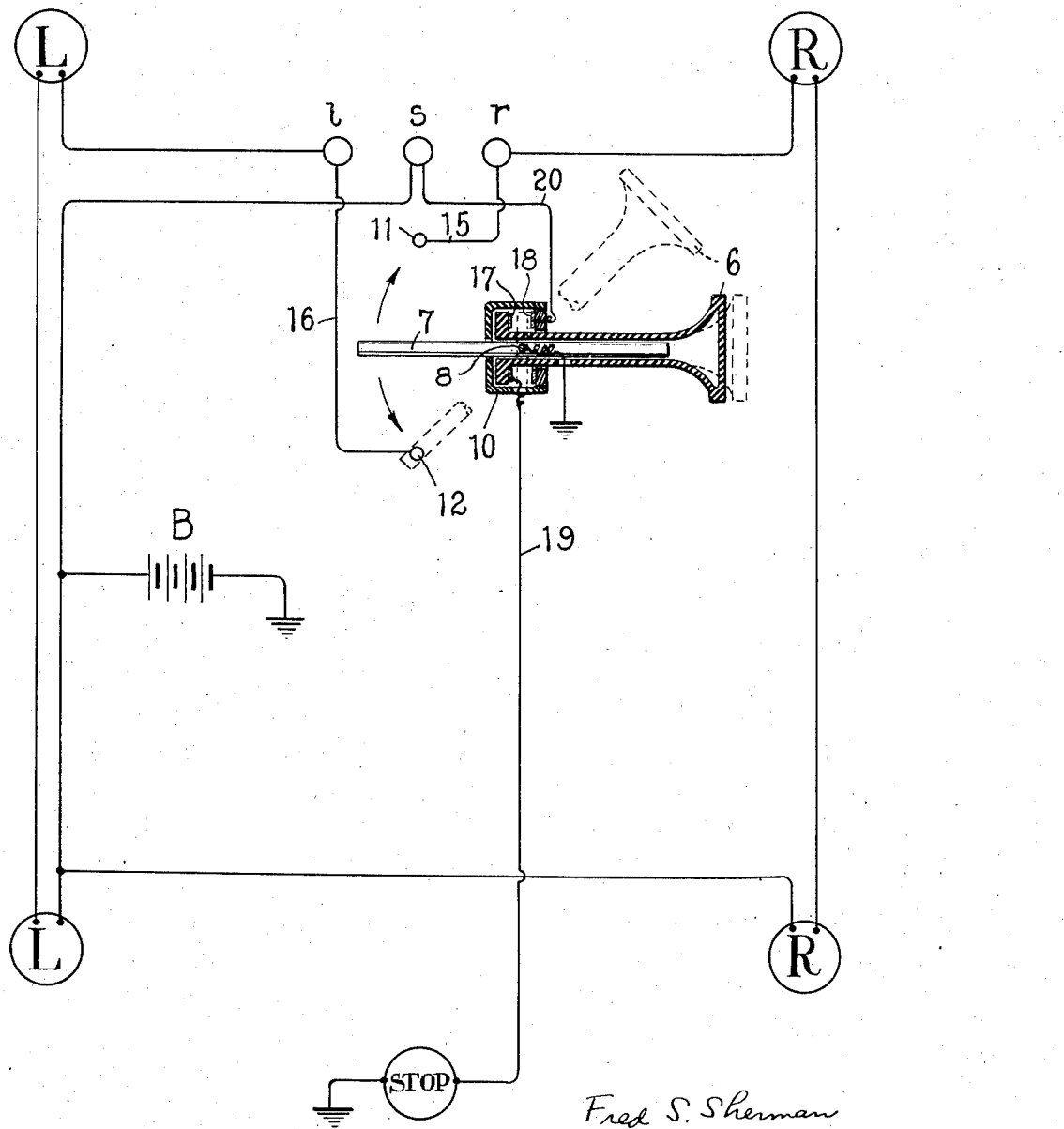

Patented Dec. 22, 1936

2,065,237

UNITED STATES PATENT OFFICE 2,065,237

VEHICLE SIGNALING SWITCH

Jesse H. McCloud, Staley M. McCaskill, and Fred S. Sherman, Norfolk, Va.

Application October 22, 1932, Serial No. 639,050

2 Claims. (Cl. 200—6)

Our invention relates to vehicle signaling systems and devices, and more particularly to means adapted to be embodied in a motor vehicle for indicating an intention of the operator to turn or stop the vehicle.

It is an object of our invention to provide means for indicating intended stops and turns which may be actuated independently and in advance of actuation of the vehicle steering and braking agencies.

A further object is to provide signal actuating means located in such close proximity to that part of the steering wheel of the vehicle where the hands of the operator normally rest that the signal actuating means may be manipulated readily and conveniently without requiring an appreciable movement of the operator's hands.

A further object contemplates location of the signal actuating means in such position with relation to the vehicle steering wheel that an intention to turn the vehicle to the left may be signaled by moving an element of the signal actuating means co-directionally with rotation of the steering wheel in the direction required to turn the vehicle to the left, and, if desired, simultaneously with or in advance of rotation of the steering wheel. The device is also capable of indicating an intention to turn the vehicle to the right by rotating an element of the signal actuating means co-directionally with rotation of the wheel to turn the vehicle to the right, which movement of the actuating means may, if desired, be made simultaneously with or in advance of rotation of the steering wheel to effect a right turn.

A further object is to provide signaling means which will permit simultaneously signaling an intention to stop and turn to the right or to stop and turn to the left.

Another object of the invention is to provide lamps adapted to be lighted to give the desired signal and to provide a simple circuit or a series of circuits adapting the signal lamps to be energized by the source of electromotive force already present in the motor vehicle, commonly a storage battery, used to energize the usual vehicle lighting and ignition circuits.

Further objects of the invention contemplate the provision of simple, efficient and inexpensive mechanism and physical parts for effecting the foregoing and other objects.

The invention is illustrated in one preferred form of embodiment in the accompanying drawings which form part of this application for Letters Patent and in which the same reference character designates like parts in the several views.

In the drawings,

Fig. 3 is a diagrammatic view of the circuits employed in our system.

It is to be understood that our invention is particularly adapted to be embodied in a motor vehicle having the customary steering column and steering wheel. The invention contemplates installation on such a vehicle of signal lamps, preferably two lamps visible from the front, one to indicate a proposed left turn and one to indicate a proposed right turn, and similar lamps visible from the rear, in addition to another lamp visible from the rear adapted to indicate an intention to stop the vehicle. Of course, any suitable arrangement of lamps may be employed, including an arrangement whereby each lamp may be visible from both front and rear. The invention is not limited to any specific location of lamps, as will be understood.

Figure 1:
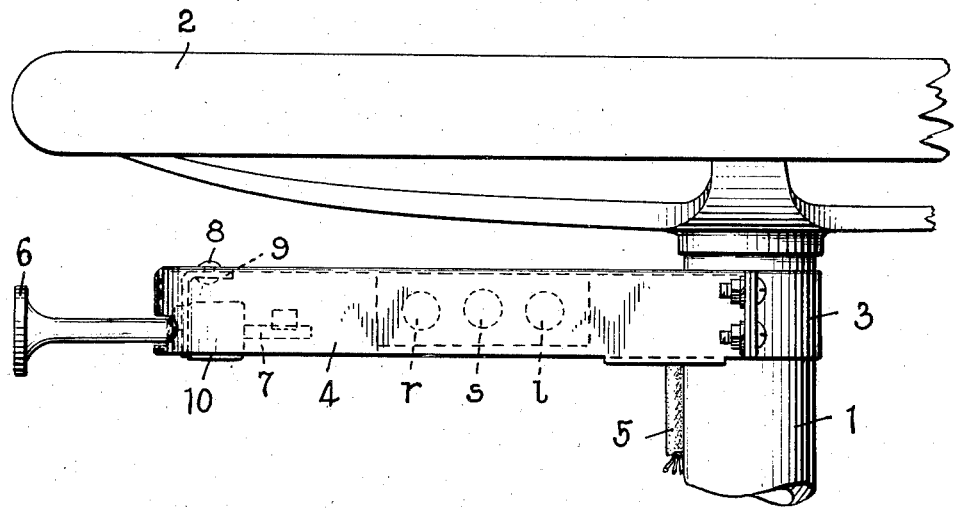
Figure 1 is a front elevational view, taken from a point near the dash and looking toward the rear of the vehicle, showing a portion of the steering column and wheel with our switch box and appurtenant elements connected to the steering column.
Figure 2:
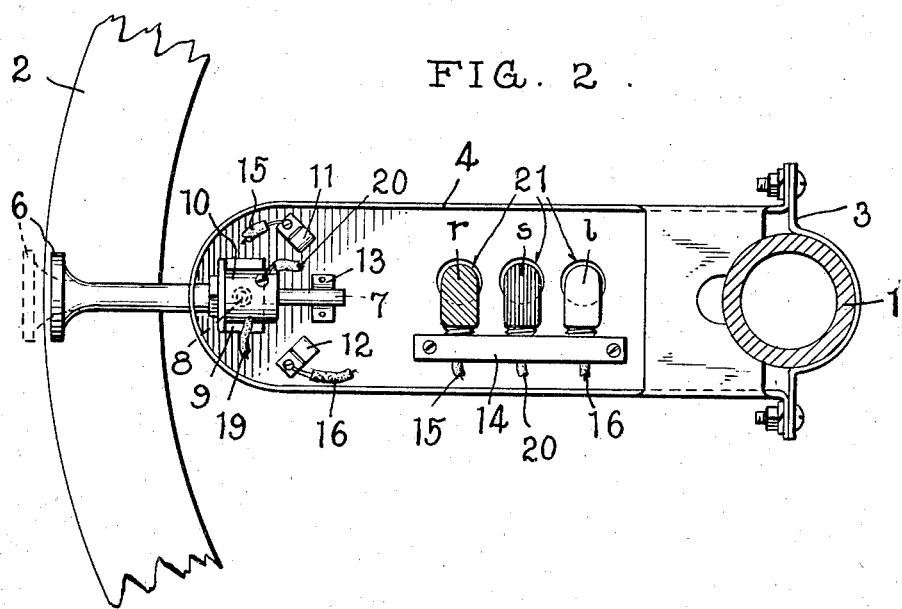
Fig. 2 is a bottom plan view of the parts shown in Fig. 1, with the bottom plate of the switch box removed.

Referring now to the drawings, and first to Figs. 1 and 2, the reference numeral 1 designates the customary steering column and 2 the steering wheel. Secured to the steering wheel by a clamp 3 is a switch box 4, into which is led a cable 5 connecting the several contacts and other contents of the switch box with the signal lamps and battery of the vehicle, as will be hereinafter explained in detail.

A feature of the invention includes locating the switch box immediately below the steering wheel, preferably radially with respect to the wheel and extending toward the right of the operator so that the handle 6 projecting through an arcuate slot in the extreme outer end of the switch box is located close to the rim of the steering wheel where the handle may be conveniently manipulated by the right hand of the operator without requiring the hand to be moved appreciably from its normal position on the steering wheel.

The handle 6 is sleeved over a switch element 7 which is pivoted in the switch box at 8, a ground being established through the pivot. The pivoted and grounded arrangement of the switch 7 may be effected in any convenient manner, such for example as by means of the angled bracket 9 connecting the pivot 8 with the cylindrical member 10 shown in the drawings. It will be evident that the switch may be rotated through a sufficient arc to engage either of the electrical contacts 11 or 12, or the dead friction clip 13 positioned midway between the electrical contacts and adapted to hold the switch out of engagement with the electrical contacts.

Within the switch box is located a multiple lamp base 14 carrying telltale lamps r, s and l. Contact 11 is connected by wire 15 through telltale r and signal lamps R, R, with one terminal of the vehicle storage battery B (or other source of electrical energy), the other terminal of which is grounded. Contact 12 is connected by wire 16 through telltale l and signal lamps L, L, with the ungrounded terminal of battery B or its equivalent.

We prefer to locate contacts 11 and 12 in the switch box in such positions with respect to steering wheel 2 that rotation of switch handle 6 co-directionally with rotation of the steering wheel to effect a right turn will engage switch 7 with contact 11, and similarly rotation of handle 6 co-directionally with the rotation of the steering wheel required to effect a left turn will engage switch 7 with contact 12. Thus, if the switch box extend to the right of the operator contact 11 will be located forwardly of contact 12.

It will be obvious that with the arrangement hereinabove described an intention to signal a right turn may be effected by rotating switch handle 6 toward the right either simultaneously with rotation of the steering wheel or in advance thereof, and an intention to turn the vehicle to the left may be signaled by rotating switch handle 6 to the left, either rotation of the handle completing circuits to light the appropriate signal and telltale lamps.

Switch handle 6 is sleeved over switch 7 and is reciprocable axially thereof. Reciprocation of handle 6 engages a contact 17 fast on the handle with a contact 18 fixed in the housing 10. Contact 17 is grounded through the stop light by wire 19, and contact 18 is connected to the ungrounded terminal of battery B through telltale s by wire 20. It will be evident that the stop light and telltale s may be energized by closing contacts 17 and 18 to indicate an intention to stop the vehicle, and that this signal may be given independently of and without relation to the position of switch 7 and the condition of the right and left turn signal circuits. Hence, our device may be used to indicate simultaneously an intention to turn the vehicle to the left and stop, or merely stop, or merely turn to the left or to the right.

The upper surface of the switch box 4 is perforated at 21 above each of the telltales so that light from the telltales may be seen by the operator. Since each telltale is in series with its signal lamp R, L or S, the operator is assured by lighting of the telltales that the proper signal lamps are lighted.

It will be understood that the invention has been shown and described in the drawings in a preferred form of embodiment only, merely for purposes of exemplification. It is believed that the broad principles of the invention and certain desirable features and advantages of its particular embodiment will be clear to those skilled in the art to which the invention relates, and it is to be understood that the invention is capable of embodiment in other and further modified forms, all of such modified forms, to the extent that they embody the principles of the invention as pointed out in the appended claims, being deemed within the scope and purview thereof.

Having thus described our invention what we claim and desire to secure by Letters Patent is:

1. Signaling means for a vehicle having a steering column and steering wheel comprising a switch box, a switch and an unbiased handle slidably sleeved on the switch, an element pivoted in the switch box and carrying said switch handle whereby the switch and handle are pivotally mounted in the switch box and said handle extends from one end of the switch box, contacts angularly spaced in the switch box adapted to be engaged by the switch upon pivotal movement thereof, a contact mounted in said element, a contact carried by the slidable handle adapted to engage the last named contact when the handle is manually slid on the switch, and means for securing the other end of the switch box to the side of the steering column whereby the handle extends close to the rim of the steering wheel.

2. The combination claimed in claim 1 including a friction clip positioned intermediate the angularly spaced contacts in the switch box for yieldably maintaining the switch out of contact with said contacts.

JESSE H. McCLOUD.
STALEY M. McCASKILL.
FRED S. SHERMAN.